United States Patent
Wang

(10) Patent No.: US 9,673,437 B2
(45) Date of Patent: Jun. 6, 2017

(54) BATTERY PACK

(71) Applicant: SAMSUNG SDI CO., LTD., Yongin-si, Gyeonggi-do (KR)

(72) Inventor: Han-Jun Wang, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 107 days.

(21) Appl. No.: 14/632,063

(22) Filed: Feb. 26, 2015

(65) Prior Publication Data

US 2015/0311495 A1    Oct. 29, 2015

(30) Foreign Application Priority Data

Apr. 28, 2014  (KR) .................. 10-2014-0050923

(51) Int. Cl.
*H01M 2/34* (2006.01)
*H01M 2/20* (2006.01)
*H01M 2/10* (2006.01)

(52) U.S. Cl.
CPC ......... *H01M 2/202* (2013.01); *H01M 2/1061* (2013.01); *H01M 2/1077* (2013.01)

(58) Field of Classification Search
CPC .... H01M 2/347; H01M 2/202; H01M 2/1077; H01M 2/1061
See application file for complete search history.

(56) References Cited

U.S. PATENT DOCUMENTS

| 2009/0246620 A1 | 10/2009 | Lee et al. |
| 2011/0039131 A1 | 2/2011 | Moon |
| 2011/0086242 A1 | 4/2011 | Lee |
| 2011/0097618 A1* | 4/2011 | Hauck ............... H01M 2/206 429/158 |
| 2012/0052331 A1* | 3/2012 | Park ..................... H01M 2/202 429/7 |
| 2012/0214024 A1* | 8/2012 | Moon ................ H01M 2/1061 429/7 |

FOREIGN PATENT DOCUMENTS

| KR | 10-2009-0103404 A | 10/2009 |
| KR | 10-2011-0017821 A | 2/2011 |
| KR | 10-2011-0038914 A | 4/2011 |

* cited by examiner

*Primary Examiner* — Muhammad Siddiquee
(74) *Attorney, Agent, or Firm* — Lee & Morse P.C.

(57) ABSTRACT

A battery pack includes a plurality of battery cells, a board assembly including first and second boards, the first and second boards extending across electrode tabs of the battery cells and electrically connecting the plurality of battery cells via the electrode tabs, and an insulation member including a base and at least one bent part, the base being disposed between the board assembly and the plurality of battery cells, and the at least one bent part extending from the base toward the board assembly and being bent to cover an edge of the board assembly.

15 Claims, 6 Drawing Sheets

BATTERY PACK

CROSS-REFERENCE TO RELATED APPLICATION

Korean Patent Application No. 10-2014-0050923, filed on Apr. 28, 2014, in the Korean Intellectual Property Office, and entitled: "Battery Pack," is incorporated by reference herein in its entirety.

BACKGROUND

1. Field

One or more embodiments relate to a battery pack.

2. Description of the Related Art

Unlike primary batteries, secondary batteries are rechargeable. Secondary batteries are used as energy sources of devices such as mobile devices, electric vehicles, hybrid electric vehicles, electric bicycles, and uninterruptible power supplies. Single-cell secondary batteries or multi-cell secondary batteries (secondary battery packs), in which a plurality of cells are connected, are used according to the types of external devices using the secondary batteries.

Small mobile devices, e.g., cellular phones, may be operated for a predetermined time with the output and capacity of single-cell secondary batteries. However, battery packs having high-output, high-capacity features may be suitable for devices requiring a long operating time and a large amount of driving power such as large mobile devices, e.g., laptop computers, electric vehicles, and hybrid electric vehicles. The output voltages or currents of battery packs may be increased by adjusting the number of battery cells included in a battery pack.

SUMMARY

One or more embodiments include a battery pack having improved electric insulation characteristics so that conductive tracks of a board assembly having different polarities may not be electrically short-circuited in spite of external vibration or impact in an electric connection structure between a plurality of battery cells and the board assembly.

According to one or more embodiments, a battery pack includes a plurality of battery cells, a board assembly including first and second boards that extend across electrode tabs of the plurality of battery cells to electrically connect the battery cells via the electrode tabs, and an insulation member including a base and at least one bent part, the base being disposed between the board assembly and the plurality of battery cells, and the at least one bent part extending forward from the base and being bent to cover an edge of the board assembly.

The bent part may cover an edge of the first board adjacent to the base.

The bent part is bent to cover the edge of the first board may extend between the first and second boards.

At least one of the electrode tabs may extend across the insulation member and the first board disposed in front of the battery cells and may be coupled to the second board.

At least one of the electrode tabs may extend across an edge of the first board and the bent part covering the edge of the first board and may be coupled to the second board.

The base and the bent part of the insulation member may be formed as one piece.

The insulation member may be formed of insulation tape.

At least one of the electrode tabs may extend from the battery cell disposed at a rear side and is coupled to the second board across the insulation member and the first board disposed at a front side.

At least one of the electrode tabs may extend across an edge of the first board and the bent part covering the edge of the first board and may be coupled to the second board disposed at a front side.

The base and the bent part of the insulation member may be formed as one piece.

The bent part may extend from an upper edge of the base in a bent shape.

A plurality of bent parts may be provided to be spaced apart from each other in a length direction of the insulation member.

The bent parts may be formed at positions corresponding to cell connection parts of the second board to which some of the electrode tabs of the plurality of battery cells are coupled.

The bent parts may cover an edge of the first board and may be formed at positions corresponding to cell connection parts of the second board disposed in front of the first board, and some of the electrode tabs of the plurality of battery cells may be coupled to the cell connection parts.

The first and second boards may overlap each other in a front-and-back direction with reference to the board assembly.

The first and second boards may include first and second conductive tracks having different electric potentials.

The first board may include a first conductive track corresponding to a positive or negative electrode of the battery pack.

A protective circuit module may be disposed in front of the board assembly and may be electrically connected to the battery cells C to control charging and discharging of the battery cells.

Each of the first and second boards may include a protective circuit module (PCM) connection part for forming an electric contact with the protective circuit module.

The first board may include a first conductive track and an insulation coating, and the first conductive track may be double-insulated by the insulation coating and the insulation member.

The battery cells may include a serial connection and a parallel connection.

The battery cells may include pairs of battery cells connected in parallel, and the pairs may be connected in series.

The first board may be coated with an insulation coating, the insulation coating and the at least one bent part being between the first board and a corresponding electrode tab.

The electrode tabs of the plurality of battery cells may overlap respective bent parts.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
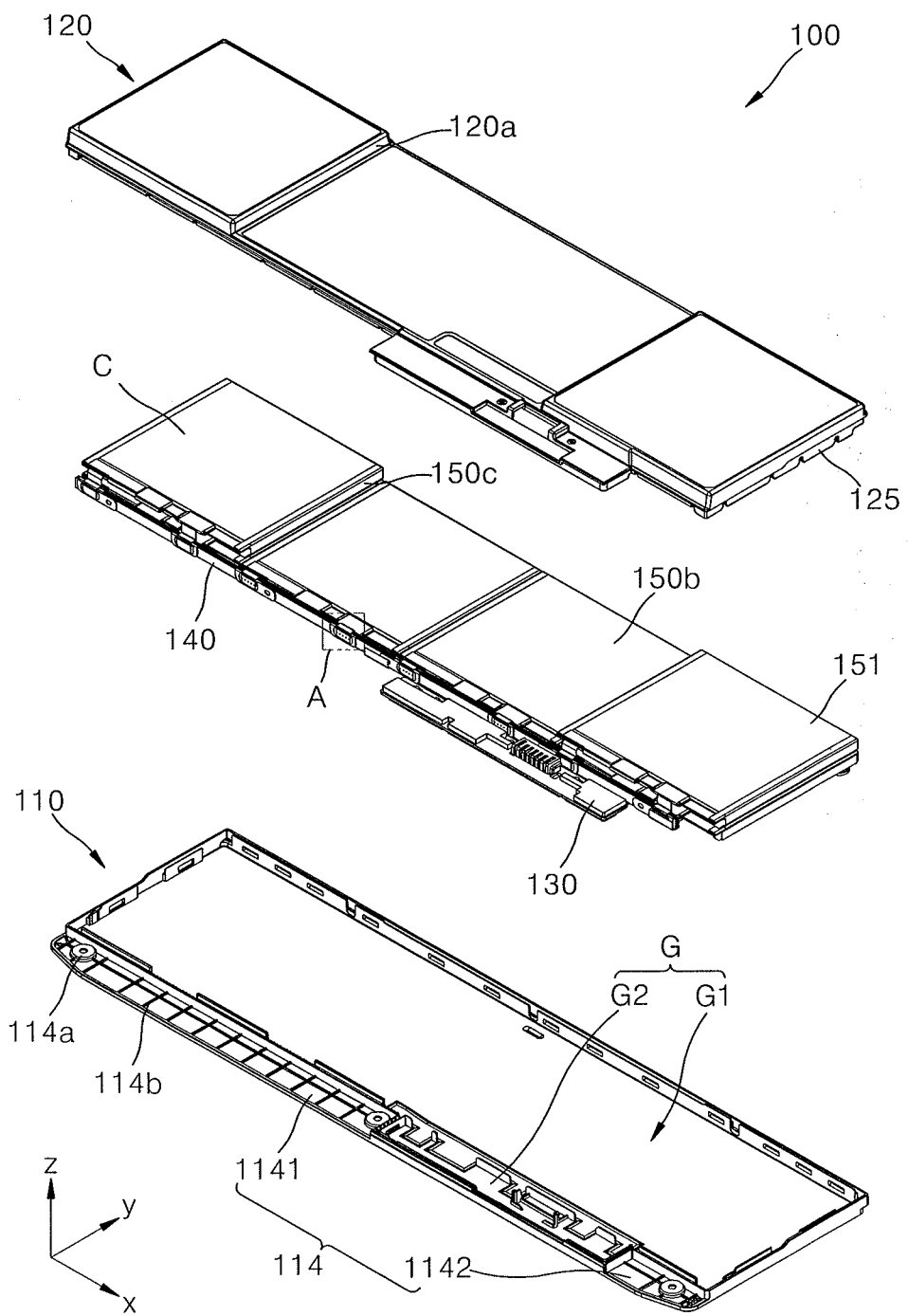
FIG. 1 illustrates an exploded perspective view of a battery pack according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In the drawing figures, the dimensions of layers and regions may be exaggerated for clarity of illustration. Further, it will also be understood that when a layer or element is referred to as being "on" another layer or element, it can be directly on the other layer or element, or intervening elements may also be present. In addition, it will also be understood that when a layer or element is referred to as being "between" two elements, it can be the only element between the two elements, or one or more intervening elements may also be present.

A battery pack will now be described in detail with reference to the accompanying drawings, in which exemplary embodiments are shown.

FIG. 1 illustrates an exploded perspective view of a battery pack 100 according to an embodiment. Referring to FIG. 1, the battery pack 100 may include one or more battery cells C, and first and second cases 110 and 120.

The first and second cases 110 and 120 may be coupled together to face each other while forming an accommodation space G in which the battery cells C may be accommodated. For example, the first and second cases 110 and 120 may be coupled together to face each other in a state where at least one battery cell C is disposed in the accommodation space G formed therebetween.

The accommodation space G defined by the first and second cases 110 and 120 may include a cell accommodation space G1 for accommodating the battery cells C, and a circuit accommodation space G2 for accommodating a circuit portion used to control charging and discharging of the battery cells C. For example, the cell accommodation space G1 may occupy a large portion, e.g., almost the entire region, of the accommodation space G, and may accommodate an appropriate number of the battery cells C to meet the required output power of the battery pack 100. For example, in an embodiment, six battery cells C may be accommodated in the cell accommodation space G1.

The battery cells C may be parallelly arranged side by side on a same level, e.g., along the x-axis, or may be stacked on different levels (upper and lower levels) by disposing one battery cell C on top of another battery cell C, e.g., along the z-axis. In addition, both the side-by-side arrangement and the stacking arrangement of the battery cells C may be used in combination with each other.

For example, in an embodiment, four battery cells C may be arranged side by side to form a first layer along the x-axis, and two battery cells C may be disposed on the first layer to form a second layer along the x-axis. In detail, as illustrated in FIG. 1, four battery cells C may be arranged side by side on the first case 110, and two battery cells C may be disposed on top of the first and fourth battery cells C of the first layer, i.e., on the left and right ends of the four battery cells C.

When the battery cells C neighboring each other are stacked in different numbers of layers, there may be a height step 150c between main surfaces 150b of the neighboring battery cells C. For example, as illustrated in FIG. 1, when a different number of battery cells C is positioned in each layer along the x-axis, there may be a step difference along the z-axis, i.e., the height step 150c, between main surfaces 150b of the neighboring battery cells C in the different levels, e.g., a main surface 150b of a battery cell C at a higher level may have the height step 150c relative to a diagonally adjacent main surface 150b of a battery cell C at a lower level.

The second case 120 disposed on the main surfaces 150b of the battery cells C may have a shape of a step 120a matching, e.g., complementary with, the profile of the main surfaces 150b. For example, as illustrated in FIG. 1, the step 120a may include a flat center portion and edges protruding above the flat center portion, so a combined structure of the battery cells C may fit in the step 120a. In detail, the second case 120 may have the shape of the step 120a, such that the center portion overlaps the lower main surfaces 150b of the battery cells C, e.g., second and third battery cells C that are arranged as a single layer, and the edges, i.e., the left and right ends of the second case 120, protrude upward along the z-axis in a long-side direction (x-direction), e.g., to encase battery cells C stacked along the z-axis. The step 120a of the second case 120 may have a tight contact with the battery cells C at the left and right ends, which are stacked in two layers. Thus, the battery cells C may be firmly fixed at the edges of the step 120a, and the battery pack 100 may have a compact shape without any unnecessary space.

For example, the battery cells C may be rechargeable lithium-ion secondary battery cells. Each of the battery cells C may include an electrode assembly (not shown) and an exterior member 151 accommodating the electrode assembly. For example, the electrode assembly may be formed by sequentially stacking a positive electrode plate, a separator, and a negative electrode plate, and winding the stack in the form of a jell-roll. The exterior member 151 may be formed, e.g., of aluminum or an aluminum alloy. However, the exterior member 151 is not limited thereto.

As further illustrated in FIG. 1, a board assembly 140 may be disposed on outer sides of the battery cells C to electrically connect the battery cells C to a protective circuit module 130. The board assembly 140 may include conductive tracks to deliver electricity stored in the battery cells C or electricity from an external charger (not shown) to the battery cells C. The board assembly 140 may be electrically connected to the electrode assemblies (not shown) of the battery cells C to deliver electricity stored in the electrode assemblies to an external device.

The board assembly 140 may extend along the x-axis, and may electrically connect the battery cells C, for example, in series by connecting opposite polarities of the battery cells C neighboring each other or in parallel by connecting the same polarities of the battery cells C neighboring each other. The battery cells C may be connected in series, parallel, or series-parallel. For example, vertically-stacked battery cells C may be connected in parallel, and battery cells C arranged side by side may be connected in series.

For example, the board assembly 140 may include a flexible printed circuit board (FPCB). The conductive tracks of the board assembly 140 may electrically connect the battery cells C and form charging and discharging passages. The board assembly 140 may include an insulation coating for insulating the conductive tracks from surrounding factors. The insulation coating may include polyimide.

The circuit accommodation space G2 may be formed in a region of the accommodation space G. The protective circuit module 130 for controlling charging and discharging of the battery cells C is disposed in the circuit accommodation space G2. For example, the protective circuit module 130 may monitor the states of the battery cells C by detecting state variables, e.g., current and temperature values of the battery cells C, so as to control charging and discharging of the battery cells C. In addition, the protective circuit module 130 may monitor malfunctions such as overcharging, overdischarging, and an overcurrent and take safety action to prevent overheating and/or explosion.

The protective circuit module 130 may be disposed in the middle of the charging and discharging passages to disconnect or connect the charging and discharging passages. For this, the protective circuit module 130 may include switching devices. A connector (not shown) may be provided on a side of the protective circuit module 130 to deliver power to a device main body (not shown).

The circuit accommodation space G2 accommodates the protective circuit module 130 electrically connected to the battery cells C. The circuit accommodation space G2 may be formed at an edge side of the accommodation space G, i.e., in which electrode tabs (not shown) of the battery cells C protrude outward for electric connection with adjacent battery cells C. In this case, first and second flanges 1141 and 1142 may be disposed on both sides of the circuit accommodation space G2. The first and second flanges 1141 and 1142 are provided to couple the battery pack 100 to the device main body. To this end, the first and second flanges 1141 and 1142 may include bosses 114a for coupling with the device main body. In addition, the first and second flanges 1141 and 1142 may include ribs 114b as mechanical rigidity enhancing structures. The battery pack 100 may be compactly shaped without any unnecessary space by efficiently arranging the first and second flanges 1141 and 1142 and the circuit accommodation space G2.

Figure 2:
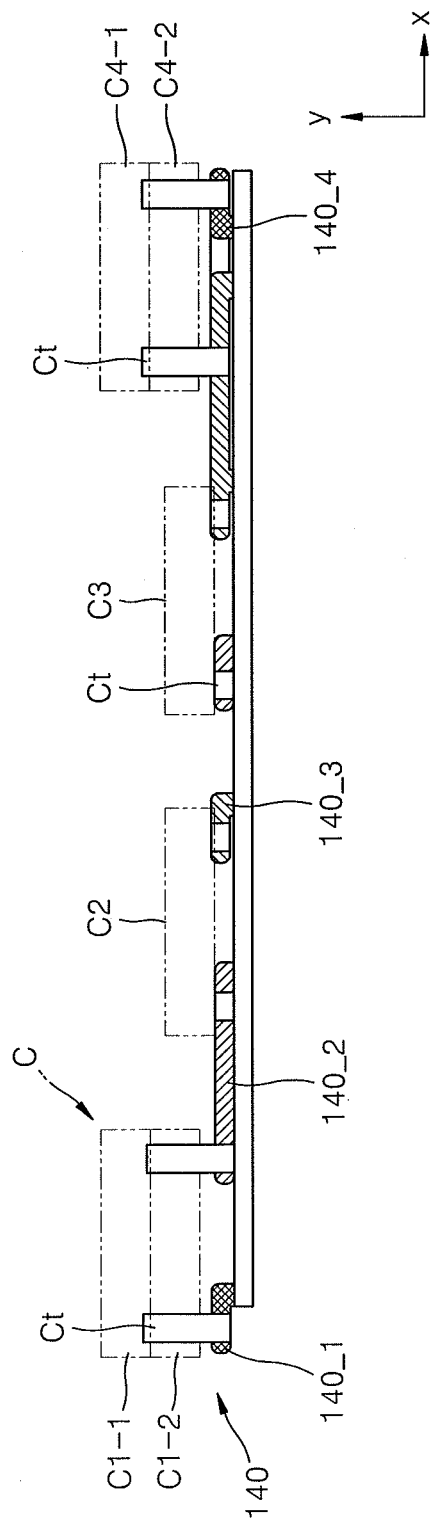
FIG. 2 illustrates a schematic view of how battery cells in the battery pack of FIG. 1 are electrically connected to each other.

FIG. 2 illustrates a schematic view of how the battery cells C are electrically connected to each other. Referring to FIG. 2, electrode tabs Ct of the battery cells C extend along the y-axis and are electrically connected through the board assembly 140, which extends along the x-axis.

In detail, the board assembly 140 may extend across the electrode tabs Ct of the battery cells C to connect the battery cells C in parallel or series. For example, first battery cells C1-1 and C1-2 may be vertically stacked along the z-axis (FIGS. 1-2) in a double layer, and fourth battery cells C4-1 and C4-2 may be vertically stacked along the z-axis in a double layer. The vertically-stacked first battery cells C1-1 and C1-2 may be connected in parallel, and the vertically-stacked fourth battery cells C4-1 and C4-2 may be connected in parallel, by connecting electrode tabs Ct thereof with a same polarity to a same contact point. For example, as the electrode tabs Ct having the same polarity of the upper first battery cell C1-1 and the lower first battery cell C1-2, that is, positive electrode tabs and negative electrode tabs, are connected to each other through the board assembly 140, the first battery cells C1-1 and C1-2 may be connected in parallel. Similarly, as the electrode tabs Ct having the same polarity of the upper fourth battery cell C4-1 and the lower fourth battery cell C4-2, that is, positive electrode tabs and negative electrode tabs, are connected to each other through the board assembly 140, the fourth battery cells C4-1 and C4-2 may be connected in parallel.

Second and third battery cells C2 and C3 may be connected in parallel. That is, as the electrode tabs Ct having the same polarity of the second and third battery cells C2 and C3, that is, positive electrode tabs and negative electrode tabs, are connected to each other through the board assembly 140, the second and third battery cells C2 and C3 may be connected in parallel.

The first battery cells C1-1 and C1-2 may be connected in series to the second battery cell C2 by connecting electrode tabs Ct having different polarities to each other. The third battery cell C3 may be connected in series to the fourth battery cells C4-1 and C4-2 by connecting electrode tabs Ct having different polarities to each other.

That is, the vertically-stacked first battery cells C1-1 and C1-2 may be connected in parallel to each other, the vertically-stacked fourth battery cells C4-1 and C4-2 may be connected in parallel to each other, and the neighboring second and third battery cells C2 and C3 may be connected in parallel to each other. In addition, the first battery cells C1-1 and C1-2 may be connected in series to the second battery cell C2, and the third battery cell C3 may be connected in series to the fourth battery cells C4-1 and C4-2.

As described above, the battery cells C may be connected through three parallel connections and two serial connections. For this, the board assembly 140 may have four different voltage levels. For example, the board assembly 140 may have positive and negative voltage levels of the battery pack 100 and voltage levels B1 and B2 corresponding to an intermediate voltage level range therebetween.

Referring to FIG. 2, the board assembly 140 may include conductive tracks 140-1, 140-2, 140-3, and 140-4 for different potentials. In detail, as shown in FIG. 2, the board assembly 140 may include a first conductive track 140_1 corresponding to a positive potential of the battery pack 100, a fourth conductive track 140_4 corresponding to a negative potential of the battery pack 100, and second and third conductive tracks 140_2 and 140_3 respectively corresponding to potentials B1 and B2 of the battery pack 100. In other embodiments, the first and fourth conductive tracks 140_1 and 140_4 may correspond to a negative potential and a positive potential of the battery pack 100, respectively.

Figure 3:
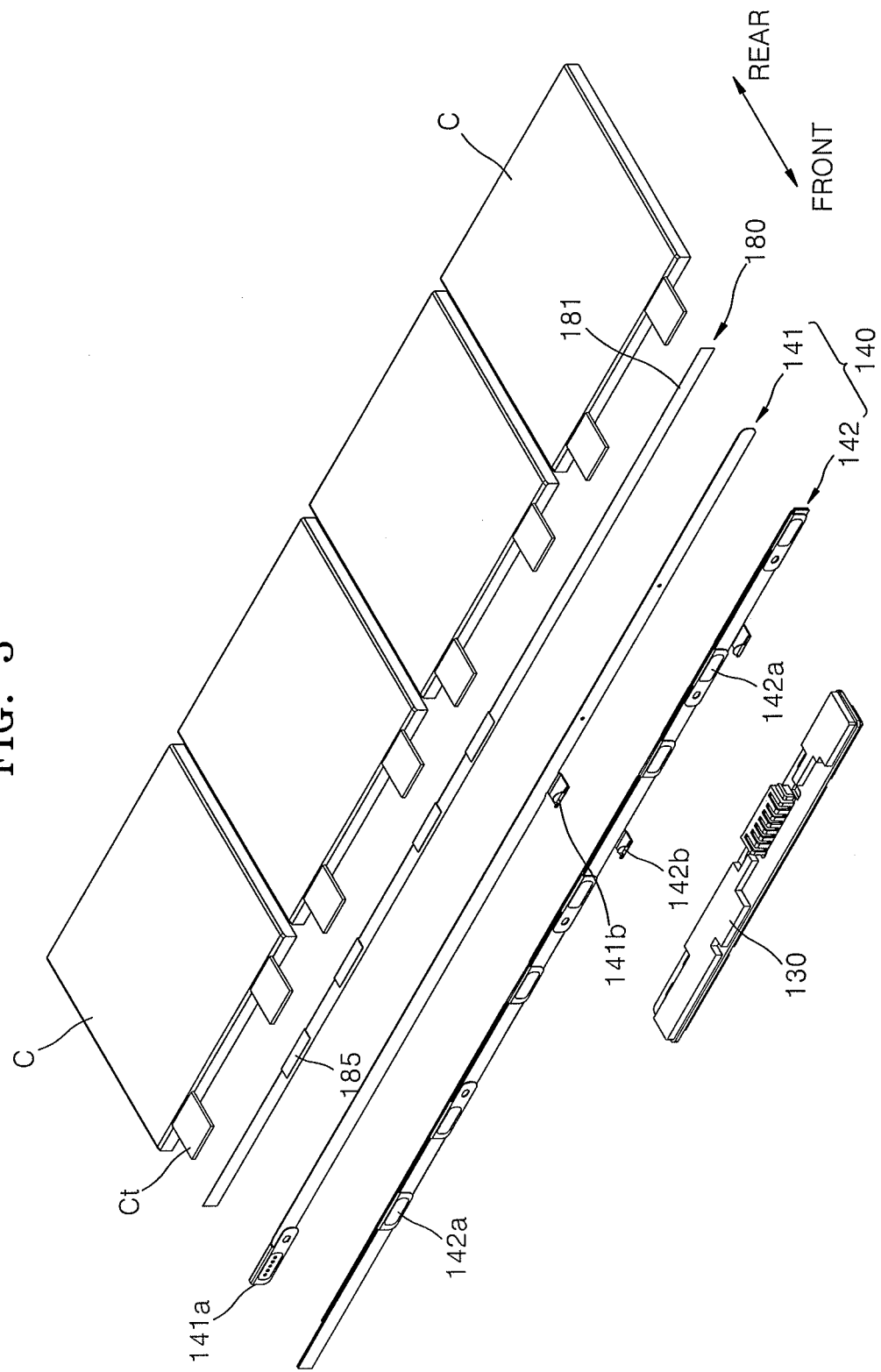
FIG. 3 illustrates an exploded perspective view of a board assembly in FIG. 1.
Figure 4:
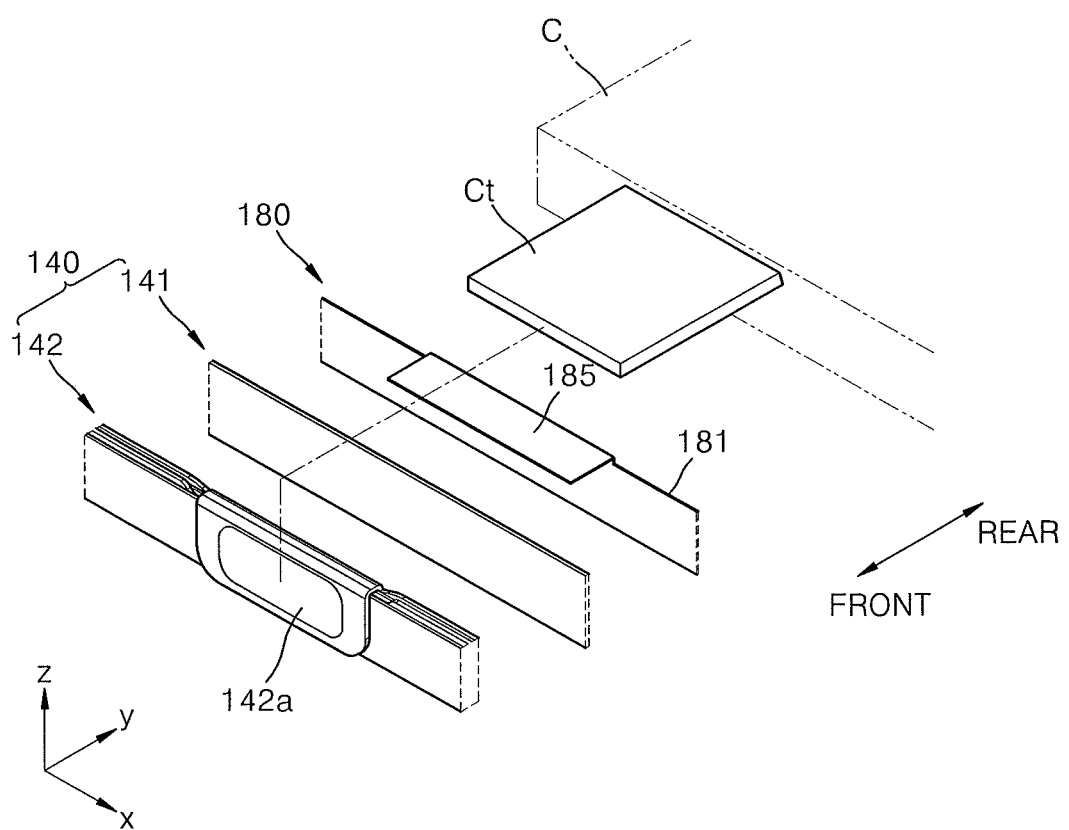
FIGS. 4 and 5 illustrate enlarged exploded and partial assembled views, respectively, of a portion of FIG. 3.
Figure 5:
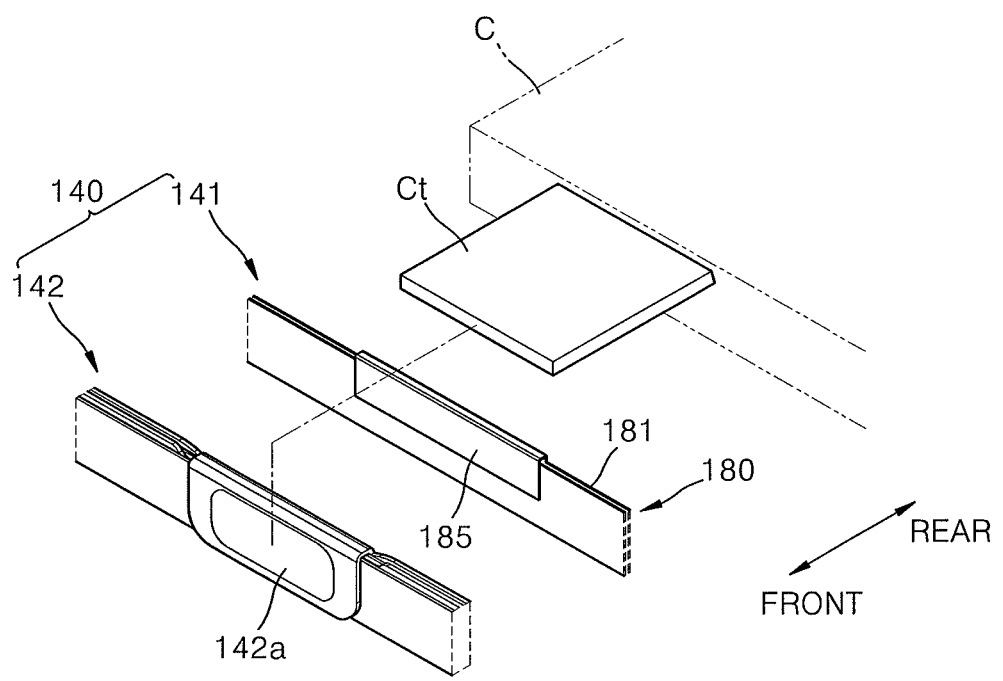

FIG. 3 illustrates an exploded perspective view of the board assembly 140 in FIGS. 1-2. FIG. 4 illustrates an enlarged, exploded view of a portion of FIG. 3, and FIG. 5 illustrates a partially assembled view of FIG. 4.

Referring to FIG. 3, the board assembly 140 may include a first board 141 including the first conductive track 140_1, and a second board 142 including the second, third, and fourth conductive tracks 140_2, 140_3, and 140_4. The first to fourth conductive tracks 140_1, 140_2, 140_3, and 140_4 of the first and second boards 141 and 142 are insulated from surrounding factors, e.g., elements, by insulation coatings, e.g., each of the first and second boards 141 and 142 may be coated with an insulating coating. As such, e.g., a short circuit between the first and second boards 141 and 142 neighboring each other may be prevented by the insulation coatings.

Current may flow between the battery cells C at the rear side and the protective circuit module 130 at the front side through the first and second boards 141 and 142. For example, the first board 141 may connect the electrode tabs Ct of the battery cells C and allow current to flow between the battery cells C and the protective circuit module 130.

The first board 141 may include a cell connection part 141a for connection with an electrode tab Ct of the battery cells C, and a protective circuit module (PCM) connection part 141b for connection with the protective circuit module 130. Similarly, the second board 142 may include cell connection parts 142*a* for connection with electrode tabs Ct of the battery cells C, and PCM connection parts 142*b* for connection with the protective circuit module 130. For example, the electrode tabs Ct may protrude from the battery cells C forward toward the cell connection parts 141*a* and 142*a* of the first and second boards 141 and 142 so as to form electric contacts with the first and second boards 141 and 142. The PCM connection parts 141*b* and 142*b* of the first and second boards 141 and 142 may extend to the protective circuit module 130 so as to form electric contacts with the protective circuit module 130.

In detail, referring to FIG. 4, the electrode tab Ct of each battery cell C may extend across the first and/or second boards 141 and 142. The insulation coatings of the boards 141 and 142 may electrically insulate the first and second boards 141 and 142 from the electrode tab Ct thereabove. For example, the electrode tab Ct may extend across, e.g., above, an upper side, e.g., edge, of the first board 141 to be, e.g., electrically, connected to the second board 142. Since the electrode tabs Ct and the first board 141 have different polarities, the insulation coating of the first board 141 functions as an insulator electrically insulating the electrode tab Ct and the first board 141 from each other.

An insulation member 180 may be disposed between the board assembly 140 and the battery cells C, e.g., the insulation member 180 may be positioned between the first board 141 of the board assembly 140 and a front side, i.e., a side including the electrode tabs Ct, of the battery cells C. For example, the insulation member 180 may electrically insulate the board assembly 140 at the front side from the battery cells C at the rear side. For example, like an insulation tape, the insulation member 180 may be attached to a side of the board assembly 140 and/or sides of the battery cells C by using an adhesive material.

The insulation member 180 may include a base 181 disposed between the board assembly 140 and the battery cells C, and bent parts 185 extending forward from the base 181 toward the board assembly 140. The bent parts 185 bend over an edge of the board assembly 140, e.g., over an edge of the first board 141, to cover the edge of the board assembly 140, e.g., to cover the edge of the first board 141.

In detail, the base 181 may be disposed between the first board 141 and the battery cells C for electric insulation therebetween. The base 181 of the insulation member 180 may have a long narrow plate shape extending in one direction, e.g., the base 181 may extend along and overlap an entire length of the first board 141 (FIG. 3).

The bent parts 185 may extend from an edge, e.g., from an upper edge, of the base 181 and may be bent to cover the first board 141. In detail, the bent parts 185 may extend forward from the base 181 toward the first board 141, and may be bent to cover the edge of the first board 141. For example, as illustrated in FIG. 3, a plurality of the bent parts 185 may be spaced apart from each other along a length direction of the base 181 to correspond to all the electrode tabs Ct extending from the battery cells C, e.g., a position of each bent part 185 may overlap a corresponding electrode tab Ct. The bent parts 185 may include an insulating material and may enhance electric insulation between the first board 141 and electrode tabs Ct extending across the upper side of the first board 141. This will now be described in more detail.

The electrode tabs Ct extending from the battery cells C may be connected to the first board 141 or the second board 142. At least some of the electrode tabs Ct may extend across, e.g., above, the insulation member 180 and the first board 141, and may form electric contacts with the cell connection parts 142*a* of the second board 142 disposed at the front side. For example, the at least some of the electrode tabs Ct may bypass the insulation member 180 and the first board 141 through passages thereabove and may be coupled to the cell connection parts 142*a* of the second board 142. For example, the electric contacts between the at least some of the electrode tabs Ct and the cell connection parts 142*a* may be secured by welding.

For example, if the electrode tabs Ct extend above the first board 141 without the insulating member 180 of the example embodiments, the insulation coating of the first board 141 may be damaged by physical interference or friction between the first board 141 and at least some of the electrode tabs Ct extending across the upper side of the first board 141. Thus, a short circuit may occur between the electrode tabs Ct and the first board 141.

That is, absent the bent parts 185 of the insulation member 180 of the example embodiments, if welded portions of the at least some of the electrode tabs Ct are shaken, e.g., jostled, left and right due to the influence of external vibration or impact, edges of the at least some of the electrode tabs Ct may make frictional contact with the upper edge of the first board 141. As such, the insulation coating of the first board 141 may be damaged, e.g., the insulation coating of the first board 141 may be chopped and/or stripped at the edge by the at least some of the electrode tabs Ct. Since the insulation coating of the first board 141 is a thin insulation film, e.g., about 0.05 mm polyimide film, the insulation coating of the first board 141 may be easily damaged if the sharp edges of the at least some of the electrode tabs Ct are shaken.

Therefore, according to example embodiments, the edge of the first board 141 that is crossed by the at least some of the electrode tabs Ct is covered with the bent parts 185 of the insulation member 180, so as to increase insulation between the electrode tabs Ct and the first board 141. As such, potential damage to the insulation coating of the first board 141 by the electrode tabs Ct thereabove may be prevented or substantially minimized. Accordingly, the bent parts 185 of the insulation member 180 according to example embodiments prevent poor insulation due to physical contact or abrasion between the first board 141 and the at least some of the electrode tabs Ct.

That is, even if the insulation coating of the first board 141 is partially stripped due to friction with the at least some of the electrode tabs Ct, poor insulation between the first board 141 and the at least some of the electrode tabs Ct may be prevented due to the insulation member 180 additionally covering the first board 141. That is, the edge of the first board 141 may be double-insulated by the insulation coating of the first board 141 and the bent parts 185 of the insulation member 180.

The bent parts 185 prevent poor insulation caused by physical interference between the at least some of the electrode tabs Ct and the first board 141. To this end, the bent parts 185 may cover the edge of the first board 141 adjacent to the at least some of the electrode tabs Ct. In some embodiments, the bent parts 185 may cover the upper or lower edge of the first board 141. In other embodiments, the bent parts 185 may cover both the upper and lower edges of the first board 141.

As shown in FIG. 5, the bent parts 185 may be bent to cover an edge of the first board 141 and extend between the first and second boards 141 and 142, e.g., the bent parts 185 may be folded over the edge of the first board 141 to be flush against a surface of the first board 141 facing the second board 142. The bent parts 185 may extend between the first and second boards 141 and 142 to enhance the insulation between the first and second boards 141 and 142, thereby preventing a short circuit therebetween.

The bent parts 185 may entirely or partially cover a gap between the first and second boards 141 and 142. The bent parts 185 may extend between the first and second boards 141 and 142 to enhance the insulation between the first and second boards 141 and 142 and maintain a predetermined distance between the first and second boards 141 and 142.

As described above, the first conductive track 140_1 of the first board 141 has an electric potential different from those of the second, third, and fourth conductive tracks 140_2, 140_3, and 140_4 of the second board 142. Therefore, the first and second boards 141 and 142 having different polarities and overlapping each other in a front-and-back direction with respect to the board assembly 140 may be short-circuited if the insulation coatings of the first and second boards 141 and 142 are damaged. Therefore, the bent parts 185 disposed between the first and second boards 141 and 142 may further enhance the insulation between the first and second boards 141 and 142. For example, the first conductive track 140_1 of the first board 141 may be double-insulated by the insulation coating of the first board 141 and the bent parts 185.

The base 181 of the insulation member 180 may electrically insulate the battery cells C from the board assembly 140, and the bent parts 185 extending forward from the base 181 and covering the edge of the first board 141 may additionally insulate the first board 141 from the at least some of the electrode tabs Ct. The base 181 and the bent parts 185 of the insulation member 180 may be formed as one piece, e.g., seamlessly integral with each other, and the bent parts 185 may be formed on the base 181 at predetermined intervals along the length of the base 181.

The positions of the bent parts 185 of the insulation member 180 will now be described with reference to FIG. 3. The bent parts 185 may be arranged in the length direction of the insulation member 180 at positions corresponding to the at least some of the electrode tabs Ct. That is, the bent parts 185 may be arranged in the length direction of the insulation member 180 at plurality of positions corresponding to the at least some of the electrode tabs Ct and separated from each other. In other words, since the at least some of the electrode tabs Ct are coupled to the cell connection parts 142a of the second board 142, the bent parts 185 may be formed at positions corresponding to the cell connection parts 142a of the second board 142. That is, the bent parts 185 may be arranged in the length direction of the insulation member 180 at the positions corresponding to the cell connection parts 142a of the second board 142. Herein, since the electrode tabs Ct extend from the battery cells C to the board assembly 140 so as to electrically connect the battery cells C and the board assembly 140, the electrode tabs Ct may be defined in terms of their functions rather than their shapes.

Figure 6:
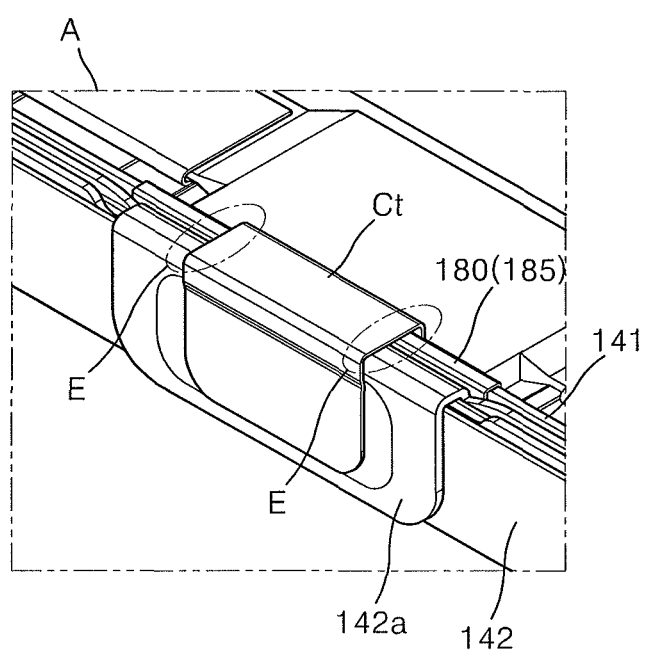
FIG. 6 illustrates an enlarged view of a portion A of FIG. 1.

FIG. 6 illustrates an enlarged view of a portion A in FIG. 1. Referring to FIG. 6, the electrode tab Ct of the battery cell C may extend across the upper side of the first board 141 and may be welded to the cell connection part 142a of the second board 142. Since the bent part 185 of the insulation member 180 covers the upper edge of the first board 141, the electric insulation between the upper edge of the first board 141 and the electrode tab Ct may be enhanced. For example, even if a welded portion between the electrode tab Ct and the cell connection part 142a is shaken left and right due to the influence of external vibration or impact, e.g., due to frictional contact between sharp edges E of the electrode tab Ct and the upper side of the first board 141, so the insulation coating of the first board 141 is stripped, the bent part 185 of the insulation member 180 covering the upper edge of the first board 141 provides sufficient insulation characteristics to the first board 141. As the insulation characteristics of the first board 141 are enhanced, a short circuit between the first board 141 and the electrode tab Ct may be prevented.

As described above, according to the one or more of the above embodiments, the insulation member 180 partially covers the board assembly 140 electrically connecting a plurality of battery cells C. Thus, the electrode tabs Ct of the battery cells C may not be short-circuited with the conductive tracks of the board assembly 140 having different electric potentials, and electric insulation characteristics of the board assembly 140 may be improved.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A battery pack, comprising:
   a plurality of battery cells;
   a board assembly including first and second boards, the first and second boards extending across electrode tabs of the battery cells and electrically connecting the plurality of battery cells via the electrode tabs; and
   an insulation member including a base and at least one bent part, the base being disposed between the board assembly and the plurality of battery cells, and the at least one bent part extending from the base toward the board assembly and being bent to cover an edge of the board assembly,
   wherein at least one of the electrode tabs of the battery cells extends over the edge of the board assembly, the at least one bent part being between the edge of the board assembly and the at least one electrode tab.

2. The battery pack as claimed in claim 1, wherein the at least one bent part covers an edge of the first board, the first board being between the second board and the base of the insulation member, and the at least one bent part being in direct contact with the first board.

3. The battery pack as claimed in claim 2, wherein the at least one bent part covers the edge of the first board and extends between the first and second boards to be parallel to the base.

4. The battery pack as claimed in claim 2, wherein at least one of the electrode tabs extends from a corresponding battery cell and is coupled to the second board, the at least one electrode tab extending above the bent part of the insulation member and the first board.

5. The battery pack as claimed in claim 2, wherein at least one of the electrode tabs extends across the edge of the first board and across the bent part covering the edge of the first board, the at least one electrode tab being coupled to the second board.

6. The battery pack as claimed in claim 1, wherein the base and the bent part of the insulation member are integral with each other to define one piece.

7. The battery pack as claimed in claim 1, wherein the bent part extends from an upper edge of the base in a bent shape.

8. The battery pack as claimed in claim 1, wherein the insulation member includes a plurality of the bent parts, the bent parts being spaced apart from each other in a length direction of the insulation member.

9. The battery pack as claimed in claim 8, wherein the electrode tabs of the plurality of battery cells overlap respective bent part, the bent parts being only at positions corresponding to the electrode tabs.

10. The battery pack as claimed in claim 8, wherein the bent parts are at positions corresponding to cell connection parts of the second board, the electrode tabs of the plurality of battery cells being coupled to respective cell connection parts of the second board.

11. The battery pack as claimed in claim 10, wherein the bent parts cover an edge of the first board, the first board being between the insulation member and the second board.

12. The battery pack as claimed in claim 1, wherein the first and second boards overlap each other in a front-and-back direction with respect to the board assembly.

13. The battery pack as claimed in claim 1, wherein the first and second boards include first and second conductive tracks having different electric potentials.

14. The battery pack as claimed in claim 1, wherein the first board includes a first conductive track and an insulation coating, the first conductive track being double-insulated by the insulation coating and the insulation member.

15. The battery pack as claimed in claim 1, wherein the first board is coated with an insulation coating, the insulation coating and the at least one bent part being between an edge of the first board and the corresponding electrode tab.

* * * * *